United States Patent
Bishop et al.

(10) Patent No.: US 10,769,676 B2
(45) Date of Patent: Sep. 8, 2020

(54) CONTROLLING SPEND PACING IN A DISTRIBUTED BIDDING SYSTEM

(71) Applicant: ADOBE INC., San Jose, CA (US)

(72) Inventors: Brian Bishop, San Jose, CA (US); Sandeep Nawathe, San Jose, CA (US); Shashank Ramaprasad, San Francisco, CA (US)

(73) Assignee: Adobe Inc., San Jose, CA (US)

(*) Notice: Subject to any disclaimer, the term of this patent is extended or adjusted under 35 U.S.C. 154(b) by 1066 days.

(21) Appl. No.: 14/922,786

(22) Filed: Oct. 26, 2015

(65) Prior Publication Data

US 2017/0116645 A1   Apr. 27, 2017

(51) Int. Cl.
*G06Q 30/02* (2012.01)

(52) U.S. Cl.
CPC ..... *G06Q 30/0275* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 8,271,345 B1* | 9/2012 | Milgrom | G06Q 30/08 705/26.1 |
| 2008/0027803 A1* | 1/2008 | Mendelevitch | G06Q 30/02 705/14.48 |
| 2014/0006141 A1* | 1/2014 | Vassilvitskii | G06Q 30/0241 705/14.45 |
| 2015/0081425 A1* | 3/2015 | Siegman | G06Q 30/02 705/14.46 |
| 2015/0112795 A1* | 4/2015 | Jalali | G06Q 30/0249 705/14.48 |
| 2015/0134462 A1* | 5/2015 | Jalali | G06Q 30/0275 705/14.71 |

OTHER PUBLICATIONS

Lee, K. C., Jalali, A., & Dasdan, A. (2013). Real Time Bid Optimization with Smooth Budget Delivery in Online Advertising. arXiv preprint arXiv:1305.3011.

* cited by examiner

*Primary Examiner* — Alexandru Cirnu
(74) *Attorney, Agent, or Firm* — Shook, Hardy & Bacon L.L.P.

(57) ABSTRACT

Embodiments of the present invention relate to facilitating control of advertisement spending. In embodiments, a spend rate allocated to a datacenter having a plurality of bidders is referenced. The spend rate allocated to the data center is used to determine a spend rate per bidder for each of the plurality of bidders within the datacenter. For each bidder, the spend rate per bidder is used to generate a bid rate indicating a number of advertisement bids to place per unit of time in accordance with a real time advertisement auction. Each bid rate generated for the corresponding bidder is intended to result in placement of an amount of advertisement bids that correspond with the spend rate per bidder. The bid rates are provided to the plurality of bidders, wherein each of the plurality of bidders uses the corresponding bid rate to determine whether to place a bid for an advertisement.

17 Claims, 8 Drawing Sheets

CONTROLLING SPEND PACING IN A DISTRIBUTED BIDDING SYSTEM

BACKGROUND

Advertising auctions are generally employed to select an advertisement to present to a user, for example, within an electronic document (e.g., a web page) served by a content server to a user device. Because the advertising opportunities (requests for advertisement bids to display an ad to a visitor on a website) outnumber the available budget, bidding on every request results in exhausting the budget quite early in the day resulting in bid opportunities being missed during later hours of the day that could potentially lead to conversions. As such, proportional allocation or pacing of advertisement spend across a time duration is frequently used in an effort to optimize the advertisement opportunities such that the advertiser does not miss out on requests during the later hours that could potentially lead to conversions. When advertisement traffic fluctuates, however, such proportional spend pacing can result in advertisement overspend or underspend.

BRIEF DESCRIPTION OF THE DRAWINGS

The present invention is described in detail below with reference to the attached drawing figures, wherein.

DETAILED DESCRIPTION

Figure 1:
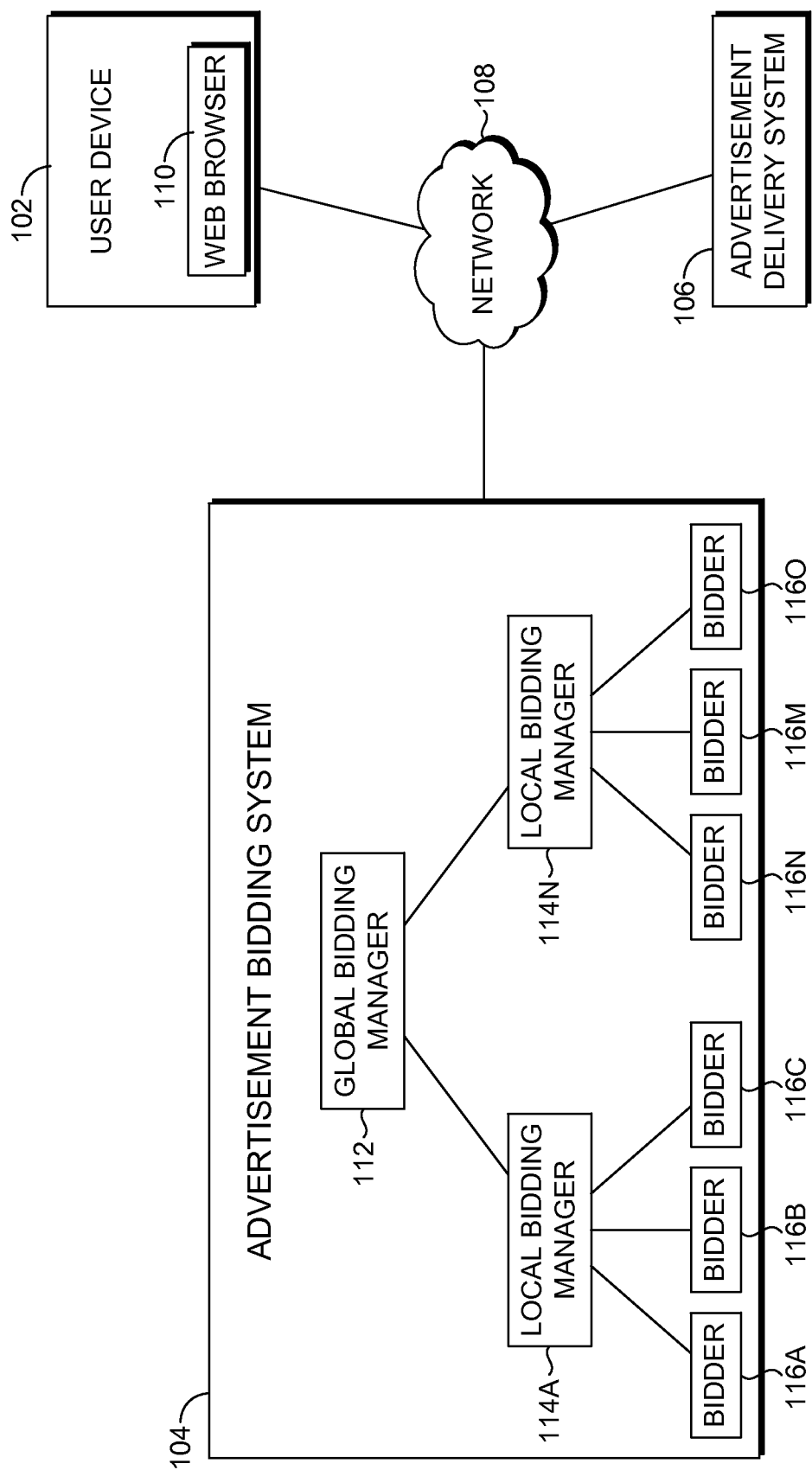
FIG. 1 is a block diagram of an exemplary computing system suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Online advertising includes presenting an advertisement within an electronic document, such as a web page, served by a content server to a user device. The web page may include an area for presenting an advertisement. When a user requests a web page from a content server, an advertising delivery engine can select an advertisement for presentation within the area provided by the web page. Advertising delivery engines often select advertisements for delivery and presentation within a web page using an auction process. In particular, an advertiser or a third-party associated with the advertiser, such as a demand side platform (e.g., Adobe Media Optimizer) establishes and places bids to participate in the real-time auction process. The determination to bid and/or an appropriate bid amount may be based on various data, such as publisher data (e.g., category of the webpage), visitor data (e.g., propensity of visitor to click or purchase, type of visitor device, geographic location of visitor), or other data (e.g., time of day). The auction generally compares bid prices associated with competing advertisement campaigns and selects the advertisement campaign having the highest bid price and/or the advertisement campaign determined likely to generate the highest advertising revenue for presentation of that advertisement. A successful bid results in an advertisement being presented to a visitor. Based on the auction mechanism, the bid winner pays a certain amount (spend or advertisement spend) to the advertisement delivery engine. The visitor could then possibly click on the displayed advertisement which would navigate the visitor to the advertiser's website and, in some cases, result in the visitor making a purchase therefrom resulting in revenue to the advertiser.

To facilitate the bidding process, some advertisers may utilize a demand-side platform to assist in determining a bid and, in some cases, placing a bid on behalf of the advertiser. Spend pacing is oftentimes desired and implemented to provide advertisement spending in a steady or consistent manner throughout a time period, such as a day. In this manner, rather than exhausting a budget in the early hours of a day, the budget can be spent in a generally consistent manner throughout the day. Spend pacing can be have many advantages including avoiding consumption of an advertising budget during one portion of time while other hours of the day may have higher traffic, a more appropriate target audience, or higher revenue.

Current proposed methods for spend pacing utilize a fraction or proportion to decide whether a bid should be placed. For example, a value of 0.2 results in a bid being placed 20% of the time to distribute spend over a time duration (e.g., a day). Such a proportional control implementation, however, does not provide a natural upper bound on the number of bids that are made by the system. As such, when traffic fluctuates, this approach can result in advertisement overspend. Further, the spend pacing issues can be exacerbated by communication delays and/or system failures, particularly when a distributed demand-side platform exists, such as when a demand-side platform is decentralized and globally distributed to handle media traffic from regional real-time bidding exchanges.

As such, in accordance with embodiments of the present invention, embodiments of the present invention are directed to facilitating control of spend pacing in an effort to minimize advertisement overspend and/or underspend. In implementation, to effectively pace advertisement spending, bid rates (number of bids to submit per time unit) are used to facilitate control of fluctuation, for example, traffic, win rate (e.g., fraction of submitted bids that actually win an advertisement auction per unit of time), etc. Bid rates indicating a number of advertisement bids to place per unit of time to be used by an advertisement bidder are generally determined based on a spend rate allocated to that advertisement bidder. As such, the bid rate is intended to result in placement of an amount of advertisement bids that correspond with the spend rate for that bidder. As the spend rates can dynamically change throughout a time period, such as a day, the bid rates can also be modified throughout the time period to account for traffic and/or spend fluctuations. Using bid rate as a control parameter permits immunity to fluctuations in the traffic. By controlling the bid rate applied or effectuated by bidders, a distributed advertisement bidding system can enable control, minimization, or even elimination of advertisement overspending or underspending. Further, such spending can be controlled even in the event network outages or software failures occur.

To control spend pacing and apply effective bid rates, the advertisement bidding system can be implemented in a multi-tiered and distributed manner. As such, an advertisement bidding system can include a global bidding manager that communicates with various local bidding managers (data centers). The global manager can provide data, such as spend rate, to each of the local bidding managers such that the local bidding managers can determine an appropriate bid rate for the bidders. As such, the global manager effectuates spend pacing control across a set of local bidding managers. Each of the local bidding managers determine bid rates and communicate the bid rates to the corresponding bidders to provide an effective bid rate for implementation by the bidders. The bid rate is then activated or implemented by the bidders to effectuate a controlled spend throughout a time duration (e.g., a day). Each bidder can independently act on the most current bid rate provided by or accessed from its local bidding manager to collectively result in placement of advertisement bids in an amount that corresponds with the spend rate allocated to the corresponding datacenter.

Using a spend pacing approach as described herein facilitates the sum of all spend rates across all of the bidders to match the expected spend for the remainder of the time duration (e.g., day) thereby providing an upper bound on the total spend for the remaining time duration. Using such a system can enable bid rates across various bidders (e.g., all bidders across all datacenters) to meet spending expectations throughout a given time duration. Further, such a distribution can provide immunity against communication failures or other system failures that occur in distributed environments.

Various terms are used throughout this description. Although more details regarding various terms are provided throughout this description, general definitions of some terms are included below to provide a clearer understanding of the ideas disclosed herein:

Advertisement spending or spending generally refers to a monetary amount of spend for advertisement delivery, such as advertisement displays, click-throughs, conversions, etc.

Spend pacing or pacing spend refers to providing advertisement spending in a steady or consistent manner. Generally, spend pacing refers to pacing spend during a time duration, such as a day. In this manner, rather than spending a budget in the early hours of a day, the budget can be spent in a generally consistent manner throughout the day. Spend pacing can have many advantages including avoiding consumption of an advertising budget during one portion of time while other hours of the day may have higher traffic, a more appropriate target audience, or higher revenue.

Spend rate refers to a monetary amount intended to be spent on advertisements per time unit. By way of example only, a spend rate might refer to dollars per second. Spend rate per bidder refers to a spend rate allocated or assigned to a particular bidder associated with a local bidding manager.

Bid rate refers to a number of advertisement bids to submit to an advertisement delivery system within a unit of time (e.g., one second, one minute, etc.). The bid rate facilitates control, minimization, or even eliminates overspending or underspending. The bid rate is based on a given spend rate such that bid rate is intended to effectuate placement of an amount of advertisement bids that correspond with the spend rate, or spend rate per bidder.

A global bidding manager refers to a manager of a plurality of local bidding managers. Generally, the global bidding manager controls the spend rate across local bidding managers.

A local bidding manager refers to a manager of a plurality of bidders. A local bidding manager is generally included within a data center to control the bid rate across the bidders within the data center.

A bidder refers to a component that utilizes a given bid rate to determine whether to place advertisement bids in response to bid requests, for example, received from an advertisement delivery system or advertisement exchange. In some cases, a bidder places bids on behalf of an advertiser. A set of bidders generally reside in a datacenter, with the datacenters being geographically dispersed to handle media traffic from regional advertisement delivery systems or advertisement exchanges.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as environment 100.

The environment 100 of FIG. 1 includes a user device 102, an advertisement bidding system 104, and an advertisement delivery system 106. Each of the user device 102, advertisement bidding system 104, and advertisement delivery system 106 may be, or include, any type of computing device (or portion thereof) such as computing device 700 described with reference to FIG. 7, for example. The components may communicate with each other via a network 108, which may include, without limitation, one or more local area networks (LANs) and/or wide area networks (WANs). Such networking environments are commonplace in offices, enterprise-wide computer networks, intranets, and the Internet. It should be understood that any number of user devices, advertisement bidding systems, and advertisement delivery systems may be employed within the environment 100 within the scope of the present invention. Each may comprise a single device or multiple devices cooperating in a distributed environment. For instance, the advertisement bidding system 104 and/or advertisement delivery system 106 may be provided via multiple devices arranged in a distributed environment that collectively provide the functionality described herein. Additionally, other components not shown may also be included within the environment 100, while components shown in FIG. 1 may be omitted in some embodiments.

The user device 102 may be any type of computing device owned and/or operated by a user or website visitor that can access network 108. For instance, the user device 102 may be a desktop computer, a laptop computer, a tablet computer, a mobile device, or any other device having network access. Generally, a user may employ the user device 102 to, among other things, access electronic documents maintained by content servers (not shown). For example, the user may employ a web browser 110 on the user device 102 to access and view electronic documents from one or more content servers. Such content servers may be any type of server device capable of hosting electronic documents from a publisher and serving the electronic documents to computing devices, such as the user device 102. By way of example, and not limitation, a content server may be a server maintaining web pages for a publisher website.

Space may be provided on an electronic document or web page for presenting advertisements. In particular, when a user accesses a web page from a content server, the advertisement delivery system 106 may facilitate selection and delivery of an advertisement(s) for presentation within the web page. In some embodiments, a web page accessed by a user may be a web page for a search engine to allow a user to search for relevant data. In such a case, a user may enter, input, or otherwise provide a search query (i.e., one or more search terms) for which related information is desired. A search query can be input via a search box associated with the search web page. Exemplary Internet search engines are well known in the art. In other embodiments, a web page accessed by a user may be any web page. In any case, when a user requests a web page or navigates thereto, such as a search results web page from a content server(s), the advertisement delivery system 106 can select an advertisement for presentation within an area(s) provided by an electronic document, or a portion thereof.

Upon the web browser 110 of the user device 102 obtaining the web page and/or selected advertisement(s), the web browser 110 can cause display such that the user of the user device 102 can view the webpage and corresponding advertisement(s). The web browser 110 is configured to render a web page(s), such as a search results web page. By way of example only, assume that a user submits a search query via a search web page. In response, the search results web page having a corresponding advertisement(s) deemed relevant to the webpage or search query can be presented to the user on a display via the web browser 110.

The advertisement bidding system 104 is generally configured to facilitate real-time bidding for advertisement presentation in an effort to effectively pace advertisement spending. Typically, the advertisement bidding system 104 communicates with the advertisement delivery system 106 (e.g., via network 108) to provide bids in participation of an auction (e.g., real-time auction). In accordance with embodiments described herein, the advertisement bidding system 104 can include general bidding manager 112, local bidding managers 114A and 114N (which may be generally referred to herein as local bidding manager(s) 114), and bidders 116A, 116B, 116C, 116N, 116M, and 116O (which may be generally referred to herein as bidder(s) 116). It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The components illustrated in FIG. 1 are exemplary in nature and in number and should not be construed as limiting. Any number of components may be employed to achieve the desired functionality within the scope of embodiments hereof. For example, any number of local bidding managers and bidders may exist. Further, components may be located on any number of servers, computing devices, or the like. By way of example only, the global bidding manager might reside on a server, cluster of servers, or a computing device remote from or integrated with one or more of the remaining components.

Each of the global bidding manager 112, local bidding managers 114, and bidders 116 may be any type of computing device, or incorporated into a computing device, owned and/or operated by an advertiser, or a representative thereof, that can access a network (e.g., network 108). For instance, the bidder 116A may be a desktop computer, a laptop computer, a tablet computer, a mobile device, a server, or any other device, or portion thereof, having network access. Generally, an advertiser or third-party in association therewith may employ the advertisement bidding system 104 to, among other things, manage advertisement bidding associated with the advertiser. An advertiser may be an individual or a representative of a company, an association, an organization, an institution, etc. that facilitates submission of an advertisement, or data associated therewith, for use in electronic display.

The advertisement bidding system 104 is generally described herein as a demand-side platform, or third-party platform that operates on behalf of an advertiser to facilitate real-time advertisement auctions for the advertiser. In this regard, the advertisement bidding system 104 can generally determine how much to bid for a given advertisement or set of advertisements in accordance with a budget received from the advertiser or set of advertisers. In this way, the advertisement bidding system 104 may communicate with an advertiser device(s) (not shown) in an effort to facilitate real-time bids. Such communication therebetween may include advertiser preferences, budgets, constraints, analysis, or the like.

Generally, a demand-side platform, or a programmatic buying system, interfaces with advertisement delivery systems (e.g., multiple delivery systems) to fulfill the task of enabling advertisers to purchase advertisement inventory in real-time from a choice of numerous (e.g., billions) of impressions every day that might be distributed across the globe. A demand-side platform operating on behalf of advertisers may be requested to meet advertiser specific spend constraints based on a monetary budget or impression budget provided by an advertiser. Further, to effectively control overspend or underspend, a demand-side platform generally seeks to control and pace advertisement spending. To appropriately and effectively handle media traffic from regional advertisement delivery systems, demand-side platforms are often distributed (e.g., globally distributed) and not centralized. As such, the components of the advertisement bidding system 104 can be distributed (e.g., globally distributed). In some cases, a local bidding manager and corresponding set of bidders can collectively make up a data center. In this regard, a data center can include a local bidding manager, such as local bidding manager 114A and corresponding bidders, such as bidder 116A, 116B, and 116C.

Although the advertisement bidding system 104 is generally described as being associated with a third-party operating on behalf of an advertiser, the functionality described herein can similarly be used directly by an advertiser (e.g., via an advertiser device or system) to facilitate real-time bidding by the advertiser. In this regard, the functionality described in connection with the advertisement bidding system 104 can be employed via an entity providing an advertisement in an effort to pace advertisement spending. Further, such technology might additionally or alternatively be implemented by an advertisement delivery system, such as advertisement delivery system 106, for utilization by an advertiser, or representative thereof, to employ the functionality described herein. For example, an advertisement delivery system might offer such functionality for access and use by an advertiser.

As previously mentioned, in embodiments, the advertisement bidding system 104 includes a global bidding manager 112, local bidding managers 114A and 114N, and bidders 116A, 116B, 116C, 116N, 116M, and 116O to facilitate advertisement bidding using an effective spend pacing approach. In particular, the advertisement bidding system 104 functions to effectively pace advertisement spending throughout a time duration (e.g., a day) in connection with an advertising bidding process.

Advertisement spending or spending generally refers to a monetary amount of spend for advertisement delivery, such as advertisement displays, click-throughs, conversions, etc. Spend pacing or pacing spend refers to providing spending in a generally steady or consistent manner. Generally, spend pacing refers to pacing spend during a time duration, such as a day. In this manner, rather than spending a budget in the early hours of a day, the budget can be spent in a generally consistent manner throughout the day. Spend pacing can be have many advantages including avoiding consumption of an advertising budget during one portion of time while other hours of the day may have higher traffic, a more appropriate target audience, or higher revenue.

At a high level, in accordance with embodiments of the present invention, to effectively pace advertisement spending, bid rates are used to facilitate control of fluctuation, for example, traffic, win rate (e.g., fraction of submitted bids that actually win an advertisement auction per unit of time), etc. A bid rate refers to a number of bids to submit to an advertisement delivery system, such as advertisement delivery system 106, within a unit of time (e.g., one second, one minute, etc.). By controlling the bid rate applied or effectuated by bidders, such as bidders 116, the advertisement bidding system 104 can control, minimize, or even eliminate overspending or underspending. Further, such spending can be controlled even in the event network outages or software failures occur.

To control spend pacing and apply effective bid rates, the advertisement bidding system 104 can be implemented in a multi-tiered and distributed manner. As such, in some embodiments, an advertisement bidding system 104 can include a global bidding manager 112 that communicates with various local bidding managers, such as local bidding manager 114A and local bidding manager 114N. The global manager can provide data, such as spend rate, to each of the local bidding managers such that the local bidding managers can determine an appropriate bid rate for the bidders. As such, the global manager effectuates spend pacing control across a set of local bidding managers. Each of the local bidding managers communicate with the corresponding bidders to provide an effective bid rate for implementation by the bidders. The spend pacing control is then activated or implemented by the bidders to effectuate a controlled spend throughout a time duration (e.g., a day). Each bidder can independently act on the most current bid rate provided by or accessed from its local bidding manager. Although not specifically illustrated in FIG. 1, in some implementations, each of the local bidding managers and corresponding bidders (in communication with the local bidding manager) can be distributed across the globe as a data center, or portion thereof. As such, each local bidding manager can provide pacing control across a set of bidders located within its data center. Each of the tiers can communicate with one another to collect and provide relevant data and, in turn, provide spend pacing guidance. Using such a system can enable bid rates across various bidders (e.g., all bidders across all datacenters) to meet spending expectations throughout a given time duration. Further, such a distribution can provide immunity against communication failures or other system failures that occur in distributed environments.

As described, the global bidding manager 112 of FIG. 1 generally facilitates spend pacing control across a set of local bidding managers, such as local bidding managers distributed across the globe with one local bidding manager per data center. The global bidding manager 112 is generally configured to determine a spend rate. A spend rate refers to a monetary amount intended to spend on advertisements per time unit. By way of example only, a spend rate might refer to dollars per second.

A spend rate at a time t may be calculated by dividing the remaining budget for a time duration divided by the remaining time within the time duration. In this manner, any missed spend can be distributed over the remaining time period. By way of example only, assume 10 hours (600 minutes) remain in a 24 hour time duration, with a remaining budget of $1000. In such a case, a spend rate of $16.66 per minute can be calculated ($10,000/600 min). In this example, a one minute unit of time was used. However, as can be appreciated, any unit of time can be used to express spend rate (e.g., second, hour, etc.).

In some cases, the spend rate can be divided by the number of local bidding managers to provide each local bidding manager with a spend rate to apply. For instance, assume two local bidding managers are in communication with the global bidding manager. In such a case, a spend rate of $8.33 per minute can be provided to each local bidding manager. As another example, $16.66 can be provided to each local bidding manager and the local bidding manager can calculate the spend rate for that local bidding manager to be $8.33 per minute.

As can be appreciated, in some implementations, the spend rate is not equal for each local bidding manager, or each datacenter. The proportions allocated to each local bidding manager can be determined in any number of manners. In one embodiment, spend rate proportions allocated to each local bidding manager is based on spend potential associated with the various local bidding managers. In this regard, a higher spend rate can be assigned to a local bidding manager, or data center, corresponding with a higher spend potential. Spend potential refers to a total amount a local bidding manager, or datacenter, could have spent without participation restraints. For instance, assume that in the recent past, for local bidding manager i, $S_i$ is the amount spent, and $p_i$ is the participation rate. In such a case, spend potential $X_i$ for the local bidding manager i is given by:

$$X_i = \frac{S_i}{p_i}$$

A fraction of spend allocated to the local bidding manager i can then be determined as $A_i$ given by:

$$A_i = \frac{X_i}{\sum_{j=1}^{n} X_j}$$

wherein n is the number of local bidding managers, and $X_i$ is the spend potential for local bidding manager i. As such, the fraction of spend allocated or assigned for each local bidding manager is proportional to the amount of spend potential for each local bidding manager as compared to the total spend potential across local bidding managers. A fraction of spend allocation can be calculated for each local bidding manager.

In this case, upon determining allocation fractions of spend, spend rate can be identified for a local bidding manager by multiplying the allocation fraction by the remaining budget divided over the remaining time. In this regard, spend rate for local bidding manager $s_i$ can be computed as:

$$s_i = A_i \times \frac{R}{T}$$

wherein $A_i$ is the allocation fraction for local bidding manager i, R is the remaining budget for a time duration, such as a day (e.g., in client time zone), and T is the time remaining in the time duration.

Figure 2A:
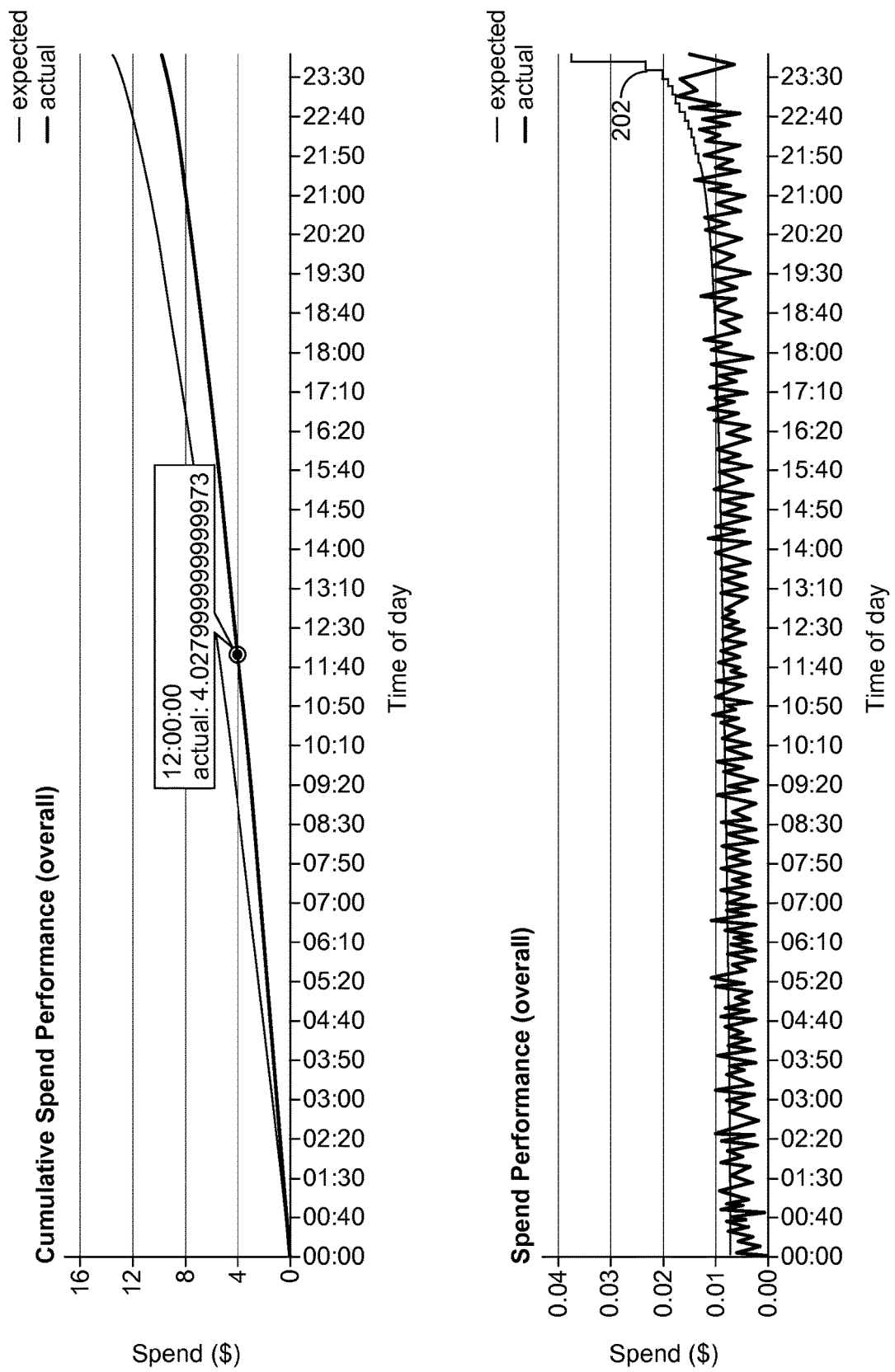
FIGS. 2A and 2B are graphical depictions illustrating exemplary spend rates over time, in accordance with an embodiment of the present invention.

As described above, spend rate is generally calculated based on the remaining budget associated with a time period divided by the remaining time in the time period. As such, the spend is distributed over the entire remaining time. In some cases, this may result in a spend rate over time which accelerates to an exponential increase near the end of the day. In other words, shortfalls not spent earlier in the day can be pushed out to the end of the day. For example, and with reference to FIG. 2A, FIG. 2A illustrates the exponential growth 202 occurring near the end of the day. Such a spend allocated at the end of the time period, or day in this case, may not be able to be used due to various constraints, or might not be used in a most profitable or effective manner. Shortfalls may occur for any number of reasons. For instance, in some cases where spend potential for a day is equal to or smaller than a given budget, when traffic subsides, a shortfall can occur.

Figure 2B:
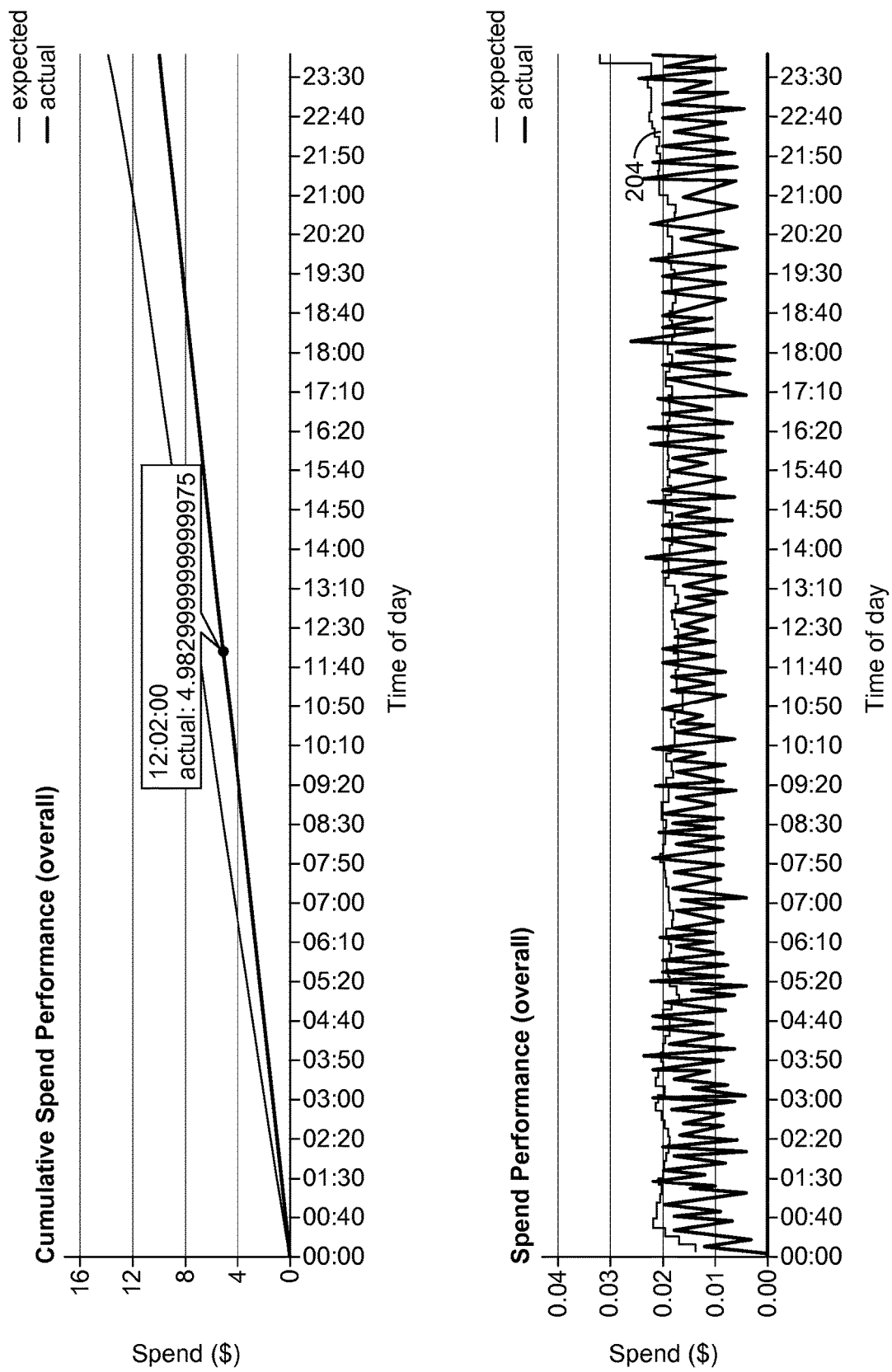

As such, in some implementations, a spend rate boost application may be applied to catch-up an actual spend that is falling behind the expected spend rate, that is, spend lags expected spend. In this regard, a spend rate boost can be applied such that any monetary spend shortfall can be spent within a short, or near, time frame, such as within the next 20 minutes (generally referred to herein as a catch-up time period). As such, instead of evenly spreading the remaining spend over the remainder of the day, a higher spend rate can be temporarily implemented in order to recoup the shortfall in the short term. In implementation, once the shortfall has been exhausted or the catch-up time period has lapsed, the initial spend rate can be returned to or a new spend rate can be calculated and applied. Utilizing a spend rate boost, when needed, can result in a more even spend through a time duration. For example, and with reference to FIG. 2B, FIG. 2B illustrates the spend performance over a day and, as illustrated, the illustrated spend 204 remains consistent throughout the day.

To calculate a spend rate boost, a spend adjustment can be determined and added to an expected spend rate, as described above. A spend adjustment refers to the amount of shortfall divided by the catch-up time period during which the shortfall is desired to be caught up. For example, assume that a shortfall of $1 has accumulated over a past hour of time. In such a case, the $1 shortfall divided by a 20 minute catch-up time period equals ¹⁄₂₀ dollar per minute to adjust spend for each minute over the next 20 minutes. As such, the spend rate boost to apply over the catch-up time period is ¹⁄₂₀ dollar per minute plus an original spend rate.

As can be appreciated, a spend rate boost calculation can be initiated in any number of circumstances. In one embodiment, a spend rate boost calculation might be triggered when the global bidding manager 112 detects a shortfall in spend, or a shortfall in spend exceeding a threshold level.

Regardless of how spend rates are computed, generation of spend rates generally utilize data associated with the various local bid managers, or data centers. As such, each of the local bidding managers may provide data to the global bidding manager 112 such that the global bidding manager can effectively facilitate spend pacing across local bidding managers. For example, each local bidding manager might provide spend amount (e.g., dollar amount), spend potential (e.g., dollars per time unit), impressions, impression potential for impressment pacing, etc. Such data can be provided in any number of manners and time frames. For instance, data can be provided on a periodic basis (e.g., every 10 minutes), upon data updates, upon request, in accordance with the global bidding manager determining a spend rate, or the like. Further, the data can be stored in a data store accessible to the global bidding manager 112 such that the global bidding manager can access the data to determine spend rates.

The spend rate, or spend rate boost, can be communicated to the local bidding managers, such as local bidding manager 114A and 114B, as appropriate. In some cases the spend rate and/or spend rate boost might be calculated on a periodic basis (e.g., every 10 minutes), upon data updates, upon detection of an event, etc. The spend rate and/or spend rate boost can then be stored (e.g., for retrieval) and/or provided to the appropriate local bidding manager 114.

Local bidding managers 114 are generally configured to manage bidders in communication with the local bidding manager. As previously described, in embodiments, the local bidding manager manages bidders located within a datacenter. In this regard, the local bidding manager 114 provides spend pacing control across a set of bidders located within its data center. As described herein, the local bidding manager 114 can utilize a spend rate provided by the global bidding system 112 to determine a bid rate for the corresponding bidders. A bid rate refers to a number of bids planned or intended to be placed per time unit. By way of example only, a bid rate might be expressed as a number of bids intended to be placed per second. Generally, a bid rate is intended so that, at each bidder, enough bids are submitted so as to meet an assigned spend rate for an adverting campaign.

To generate a bid rate for a local bidding manager, such as local bidding manager 114A, a spend rate per bidder can be initially determined. The spend rate provided to the local bidding manager from the global bidding manager can be divided up among the bidders. In some cases, the spend rate can be divvied up evenly among the bidders associated with the particular local bidding manager. Such an even distribution might occur, for instance, as bid requests can be configured to be distributed in a round-robin manner. In this case, to determine a bid rate per bidder, the number of active bidders can be maintained, for instance, at the local bidding manager as the number of active bidders may change for any number of reasons (e.g., downtimes, etc.). As described, the spend rate per bidder associated with a particular local bidding manager i, denoted by $z_i$, is given by:

$$z_i = \frac{s_i}{a_i}$$

wherein, $a_i$ is the number of active bidders associated with the local bidding manager, and $s_i$ is the spend rate assigned to the local bidding manager i. For example, assume that an active number bidders associated with a local bidding manager is 3 (e.g., bidders 116A, 116B, and 116C), and that the spend rate assigned to the local bidding manager is $3 per second. In such a case, the spend rate per bidder equals $1 per second (i.e., $3/3 bidders).

The spend rate per bidder can then be used to determine a bid rate. A bid rate ($b_i$) for a bidder associated with a local bidding manager i can be determined using the following equation:

$$b_i = \frac{z_i}{w_i \times cpi_i}$$

wherein, $z_i$ is the assigned spend rate per bidder, $w_i$ is the recent win rate (e.g., at the advertisement delivery system), and $cpi_i$ is the recent cost per impression. Because the recent win rate $w_i$ equals the number of impressions seen recently $m_i$ divided by the number of bids submitted recently $n_i$ (i.e., $w_i = m_i/n_i$) and the recent cost per impression $cpi_i$ equals the total cost of the impression $c_i$ divided by the number of impressions seen recently $m_i$ (i.e., $cpi_i = c_i/m_i$), the bid rate ($b_i$) also be determined using the following equation:

$$b_i = \frac{z_i \times n_i}{c_i}$$

wherein, $z_i$ is the assigned spend rate per bidder, $n_i$ is the number of bids submitted recently, and $c_i$ is the total cost of these impressions. In some cases, to ensure enough data, n refers to the sum of bids submitted across all bidders in the datacenter and c is the sum of impression cost across all ad servers in the datacenter.

In some cases, a fraction of a bid rate might exist, such as a bid rate of 1.5. Fractional bid rates exist based on calculations, but are difficult to implement (e.g., a bidder can't make half of a bid). Accordingly, in some cases, a probabilistic approach can be used to implement a fractional bid rate. In this regard, a fractional bid rate can be implemented by treating a mantissa (e.g., number after decimal point, such as 0.5) of the bid rate as a probability and use a random variable once per time unit. By way of example only, assume that a bid rate is 0.5. In such a case, the bidder will bid (or not) on the first bid request that it receives with a 50% probability. As another example, assume that a bid rate is 3.25. In this example, the bidder will bid on the first three bid requests it receives in a single time unit (e.g., one second, one minute, etc.), and then it will bid with a 25% probability on the fourth bid request. The fifth and subsequent bid requests during the time unit can be ignored.

The bid rate described above does not take into account projected traffic and thereby varying request rates. When a number of requests coming in per bidder per time unit is less than one, and the bid rate per bidder per time unit is also less than one, there may be a compounding effect causing too few bids being made resulting in consistent underspend. By way of example only, assume that 10 bidders exist within a data center and that two bid requests per time unit have come to the data center. At the datacenter level, a bid on one request per time unit is desired. As such, assume that a bid rate is calculated as one bid divided by 10 bidders equaling 0.1. If the datacenter receives 10 bids (1 per bidder), advertisement spend would be sufficient. However, if only two bid requests on which to bid are received, and which likely go to different bidders, the expected number of bids equals 0.2 bids across entire data center (i.e., 2 bid requests*0.1 bid rate) resulting in advertisement underspend.

As such, in some embodiments, a bid rate boost can be determined to take traffic into account and increase (e.g., temporarily) the bid rate. In some cases, a bid rate boost is calculated using a bid rate mantissa and bidder request rate mantissa. In particular, a bid rate boost equals a bid rate mantissa divided by a bidder request rate mantissa. By way of example only, assume that a 0.1 bid rate is calculated and a 0.2 bidder request rate is determined. In such a case, 0.5 is the bid rate boost (i.e., 0.1/0.2=0.5). As such, the bid rate boost takes into account traffic, that is in this example, ten bidders and two bid requests (0.2 request rate). In some cases, the request rate can be determined based on recent historical data. In this example, each of the 10 bidders can now bid on the first request with 50% probability. Out of the two incoming bid requests, it is likely that one of the bids will be successful (e.g., 2 bids*0.5=1).

As can be appreciated, a bid rate boost calculation can be initiated in any number of circumstances. In one embodiment, a bid rate boost calculation might be triggered when the local bidding manager 114 detects a reduction in traffic or underspend (e.g. traffic or underspend that does not meet expectation). For example, bid rate boost calculation might be triggered when the floor of the incoming traffic rate (per bidder) equals the floor of the assigned bid rate (per bidder). The bid rate boost may be applied for any amount of time, such as, a time during which a reduction in traffic or underspend exists or a predetermined amount of time.

Regardless of how bid rates are computed, generation of bid rates generally utilize data associated with the various bidders (e.g., within a data center). As such, each of the bidders associated with a local bidding manager may provide data (e.g., data needed to determine bid rate) to the local bidding manager such that the local bidding manager can effectively facilitate spend pacing across bidders. For example, each bidder might provide number of eligible requests by ad campaign, number of bids by campaign, etc. Such data can be provided in any number of manners and time frames. For instance, data can be provided on a periodic basis (e.g., every 10 minutes), upon data updates, upon request, in accordance with the local bidding manager determining a bid rate, or the like. Further, the data can be stored in a data store accessible to the local bidding manager 114 such that the global bidding manager can access the data to determine spend rates. In some cases, an ad impression server separate from bidders can be obtain and provide various information that might be needed to determine bid rates. For instance, an ad impression server might provide a number of impressions by campaign, monetary spend by campaign, etc. This may be the case when an ad impression server collects the number of impressions seen or total impression cost (and of which the bidder may not be aware).

The bid rate, or bid rate boost, can be communicated to the bidders, such as bidders 116A, 116B, and 116C, as appropriate. In some cases the bid rate and/or bid rate boost might be calculated on a periodic basis (e.g., every 10 minutes), upon data updates, upon detection of an event, etc. The bid rate and/or bid rate boost can then be stored (e.g., for retrieval) and/or provided to the appropriate bidder. Although described as the local bidding manager determining the bid rate, as can be appreciated, another component, such as a bidder, can determine a bid rate provided it has the appropriate data.

Bidders, such as bidders 116A, 116B, 116C, 116N, 116M, 116O, are generally configured to implement the bid rate, or bid rate boost, as appropriate. In this manner, a bidder having a bid rate can implement the bid rate such that the bidder bids on bid requests, for example, for a specific campaign, in accordance with the bid rate. Implementation of the bid rate at the bidders, as described herein, enables better control of advertisement spend pacing even in light of system fluctuation. For example, applying a given bid rate, or bid rate boost, can enable minimization of overspend and/or underspend.

As described, in some embodiments, the bidders in a data center receive bid requests from an advertisement delivery system 106 in a round robin fashion. Upon receiving bid requests, a determination of whether to bid can be made in accordance with the given bid rate. As such, each bidder can independently act on the most up-to-date spend pacing control information it has from the corresponding local bidding manager.

The advertisement delivery system 106 can receive a bid, such as a real-time bid, and utilize the bid in an advertisement auction to select an advertisement to deliver to a user. For example, assume that a bid of two cents is provided to the advertisement delivery system 106 in response to a bid request. Now assume that the advertisement associated with the two cent bid is successful in the auction. The advertisement delivery system 106 can provide an associated advertisement for transmission to a user. In some implementations, the advertisement delivery system 106 might communicate the advertisement to the user device (after the ad is selected in the advertisement auction). In other implementations, the advertisement delivery system 106 might provide the advertisement to another component (at auction time or after advertisement selection) for provision to the user device. Although a single advertisement delivery system is illustrated in FIG. 1, any number of advertisement delivery systems can provide bid requests, for example, to the bidders of the advertisement bidding system 104. An advertisement delivery system may sometimes be referred to as a real-time bidding exchange.

Figure 3:
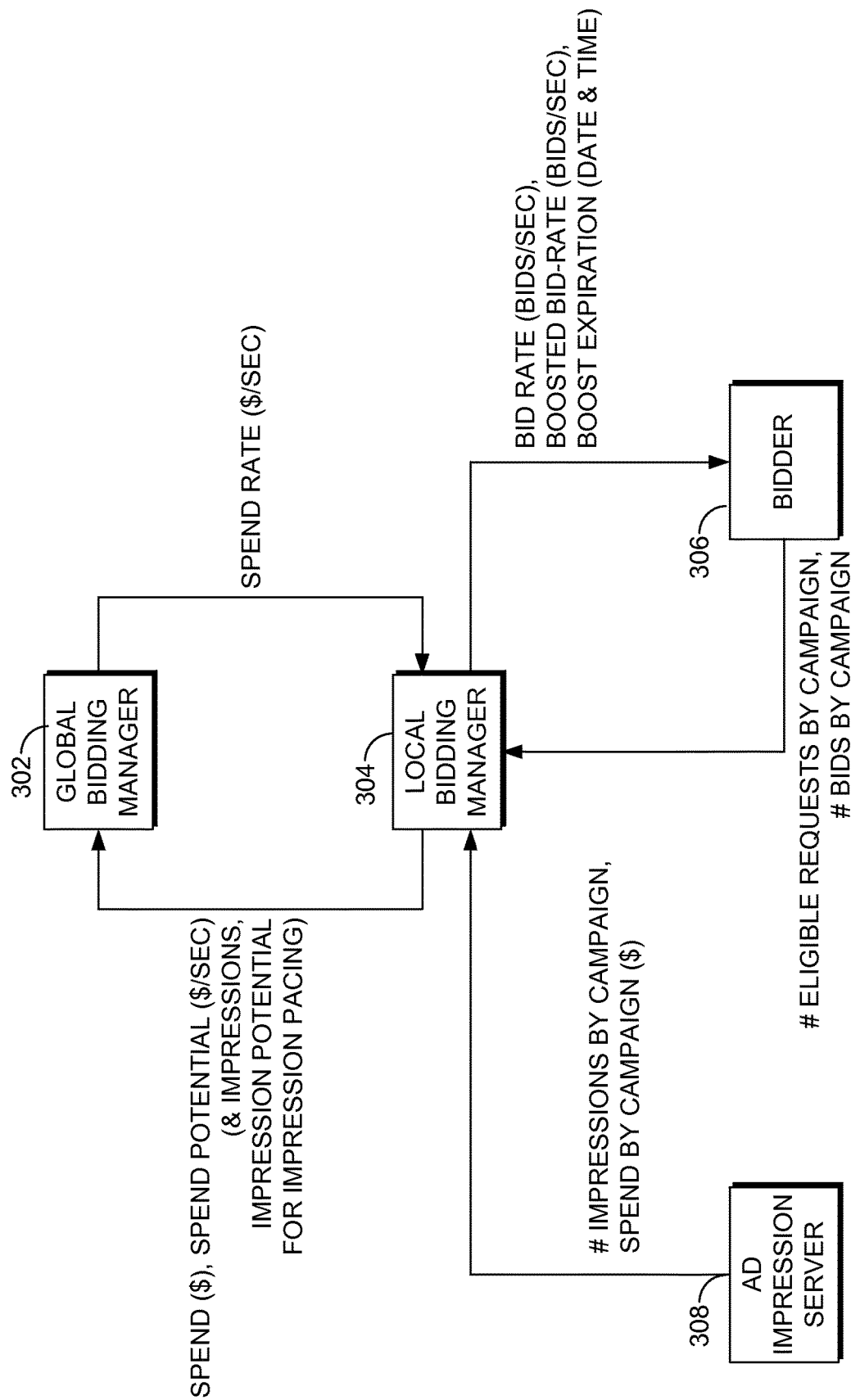
FIG. 3 is a block diagram illustrating data flow within an advertisement bidding system, in accordance with embodiments of the present invention.

Turning now to FIG. 3, FIG. 3 illustrates of data flow between components within an advertisement bidding system, such as advertisement bidding system 104 of FIG. 1. As illustrated in FIG. 3, the global bidding manager 302 can obtain information provided by the local bidding manager (e.g., at a datacenter). Such data can include, for example, spend, spend potential, impressions, impression potential, etc. Using such data collected from local bidding manager 304 (as well as other local bidding managers), the global bidding manager 302 can determine a spend rate and provide the spend rate to the local bidding manager 304.

The local bidding manager 304 can obtain various types of data. For instance, the local bidding manager 304 receives the spend rate from the global bidding manager 302, number of eligible requests and number of bids from bidder 306 (as well as other bidders), and number of impressions and spend from ad impression server 308. Using such data, the local bidding manager 304 can generate a bid rate, or boosted bid rate, and provide the rate to the bidder 306.

Figure 4:
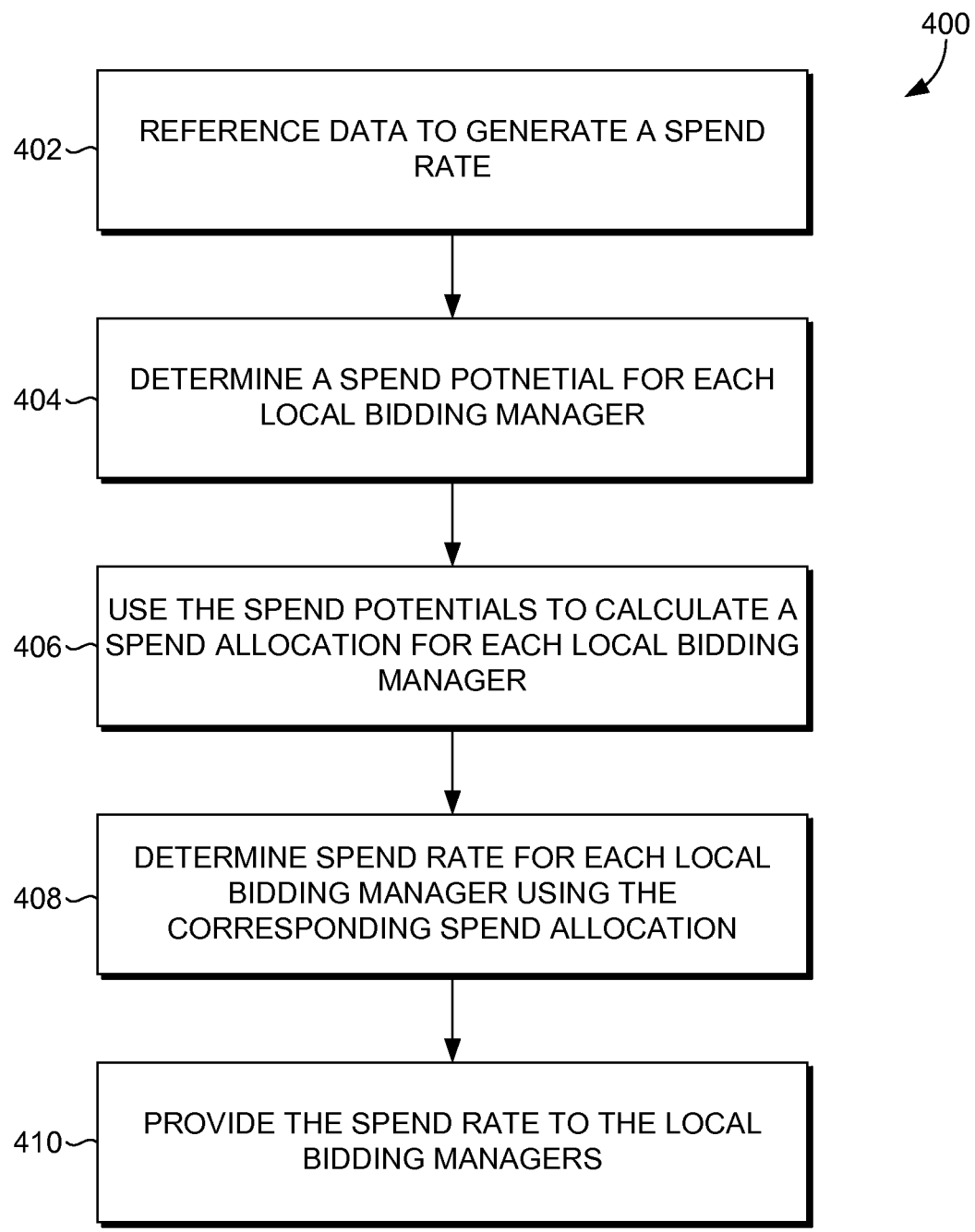
FIG. 4 is a flow diagram showing a method for facilitating control of spend pacing in accordance with an embodiment of the present invention.

Turning now to FIG. 4, a flow diagram is provided that illustrates a method 400 for facilitating control of spend pacing in accordance with an embodiment of the present invention. Such a method can be performed, for example, at a global bidding manager, such as global bidding manager 112 of FIG. 1. Although the method 400 of FIG. 4, the method 500 of FIG. 5, and the method 600 of FIG. 6 are provided as separate methods, the methods, or aspects thereof, can be combined into a single method or combination of methods. As can be appreciated, additional or alternative steps may also be included in different embodiments.

Initially, as indicated at block 402, data relevant to generating a spend rate is referenced. The data can be provided from various local bidding managers as data is collected at such data centers. At block 404, a spend potential for each local bidding manager is determined. In some cases, a spend potential is determined based on the amount spent and the participation rate. At block 406, the spend potential is used to calculate a spend allocation for each local bidding manager. The spend potential can be determined using the spend potential for a particular local bidding manager as compared to the total spend potential for all local bidding managers. At block 408, spend rate is determined for each local bidding manager using the corresponding spend allocation, the remaining budget for the time period, and the time remaining in the time period (e.g., day). Thereafter, the spend rates are provided to the corresponding local bidding manager, as indicted at block 410.

Figure 5:
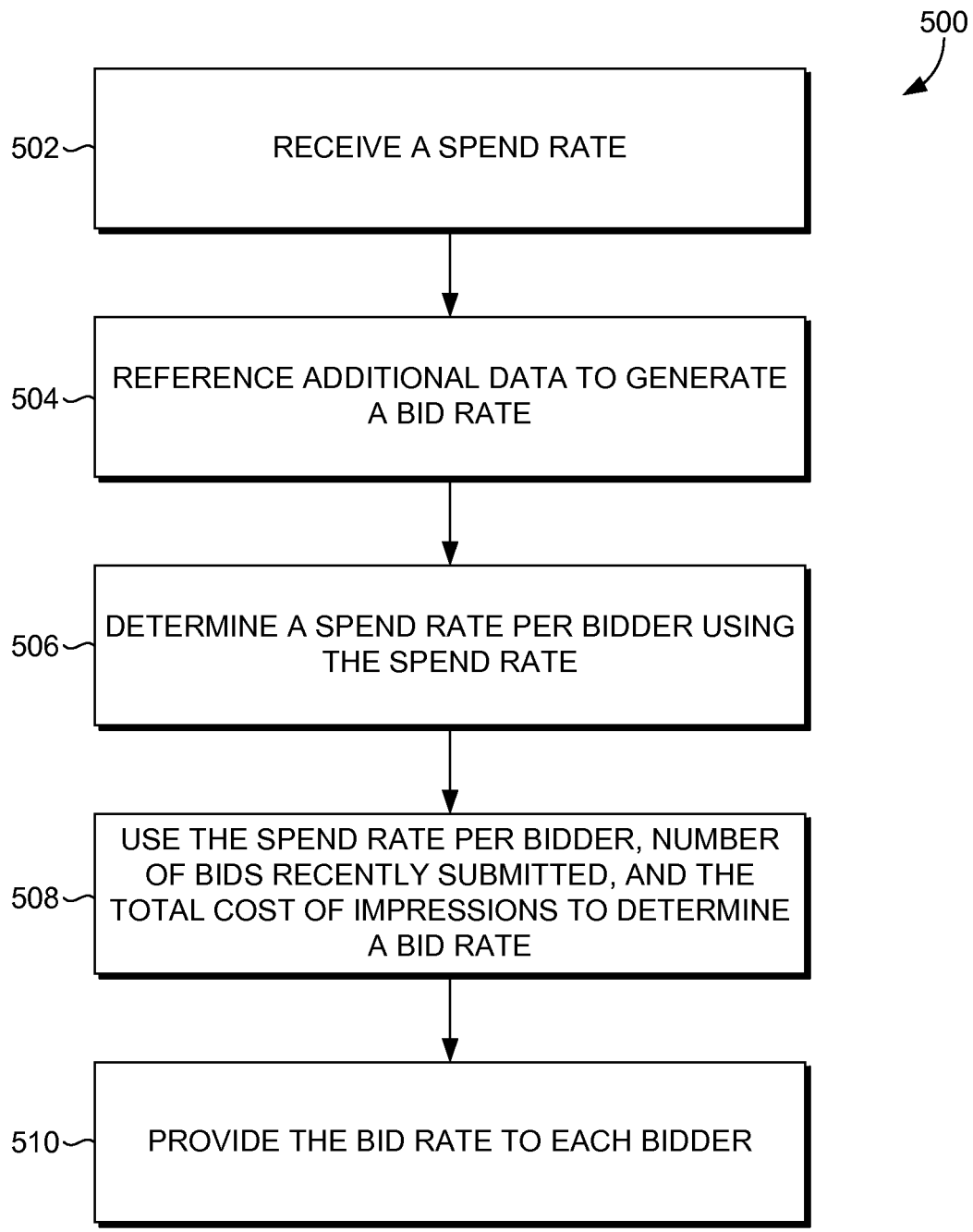
FIG. 5 is a flow diagram showing another method for facilitating control of spend pacing in accordance with an embodiment of the present invention.
Figure 6:
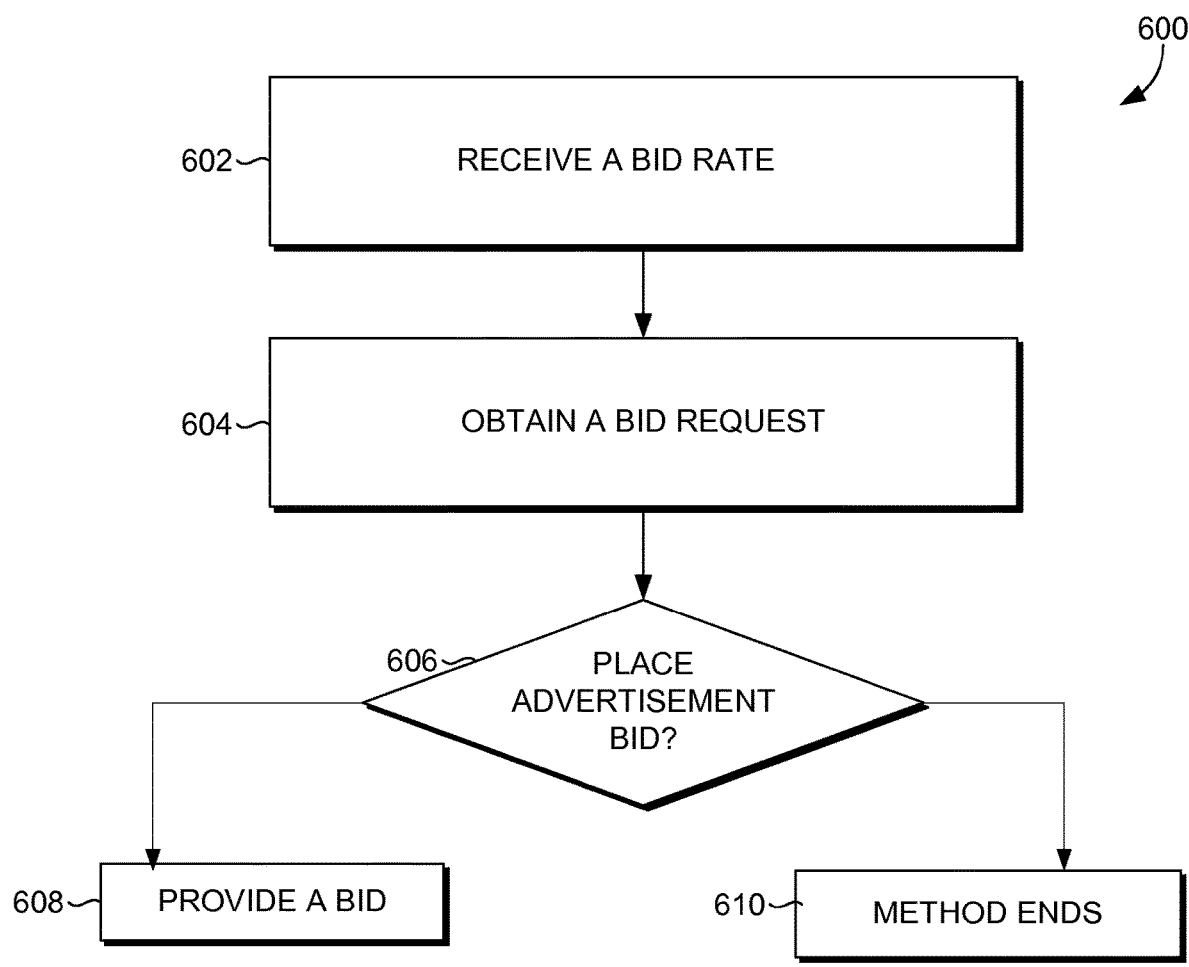
FIG. 6 is a flow diagram showing another method for facilitating control of spend pacing in accordance with an embodiment of the present invention.

With respect to FIG. 5, a flow diagram is provided that illustrates a method 500 for facilitating control of spend pacing in accordance with an embodiment of the present invention. Such a method can be performed, for example, at a local bidding manager, such as local bidding manager 114 of FIG. 1. Initially, at block 502, a spend rate is referenced. As described, a spend rate can be provided by a global bidding manager that manages and communicates with various local bidding managers. At block 504, additional data used to generate a bid rate is referenced. Such data may include a number of active bidders, recent win rate, recent cost per impression, number of bids recently submitted, number of impressions seen recently, total cost of impressions, and/or the like. At block 506, a spend rate is determined per bidder. Such a determination can be made based on the referenced spend rate assigned to the local bidding manager divided by the number of active bidders associated with the local bidding manager. Thereafter, at block 508, the spend rate per bidder is used along with the number of bids submitted recently and the total cost of impressions to determine a bid rate. At block 510, the bid rate is provided to the bidders.

With reference to FIG. 6, a flow diagram is provided that illustrates a method 600 for facilitating control of spend pacing in accordance with an embodiment of the present invention. Such a method can be performed, for example, at a bidder, such as bidder 116 of FIG. 1. Initially, as indicated at block 602, a bid rate is obtained. A bid rate can be provided by a corresponding local bidding manager. At block 604, a bid request is received, for example, from an advertisement delivery system. In response to receiving the bid request, at block 606, a determination is made as to whether to place a bid in accordance with a real-time advertising auction. Such a determination is based, at least in part, in accordance with the bid rate. If it is determined to place a bid based on the bid rate, a bid is placed, as indicated at block 608. On the other hand, if it is determined to not place a bid based on the bid rate, the method ends, as indicated at block 610.

Having described an overview of embodiments of the present invention, an exemplary computing environment in which some embodiments of the present invention may be implemented is described below in order to provide a general context for various aspects of the present invention.

Embodiments of the invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
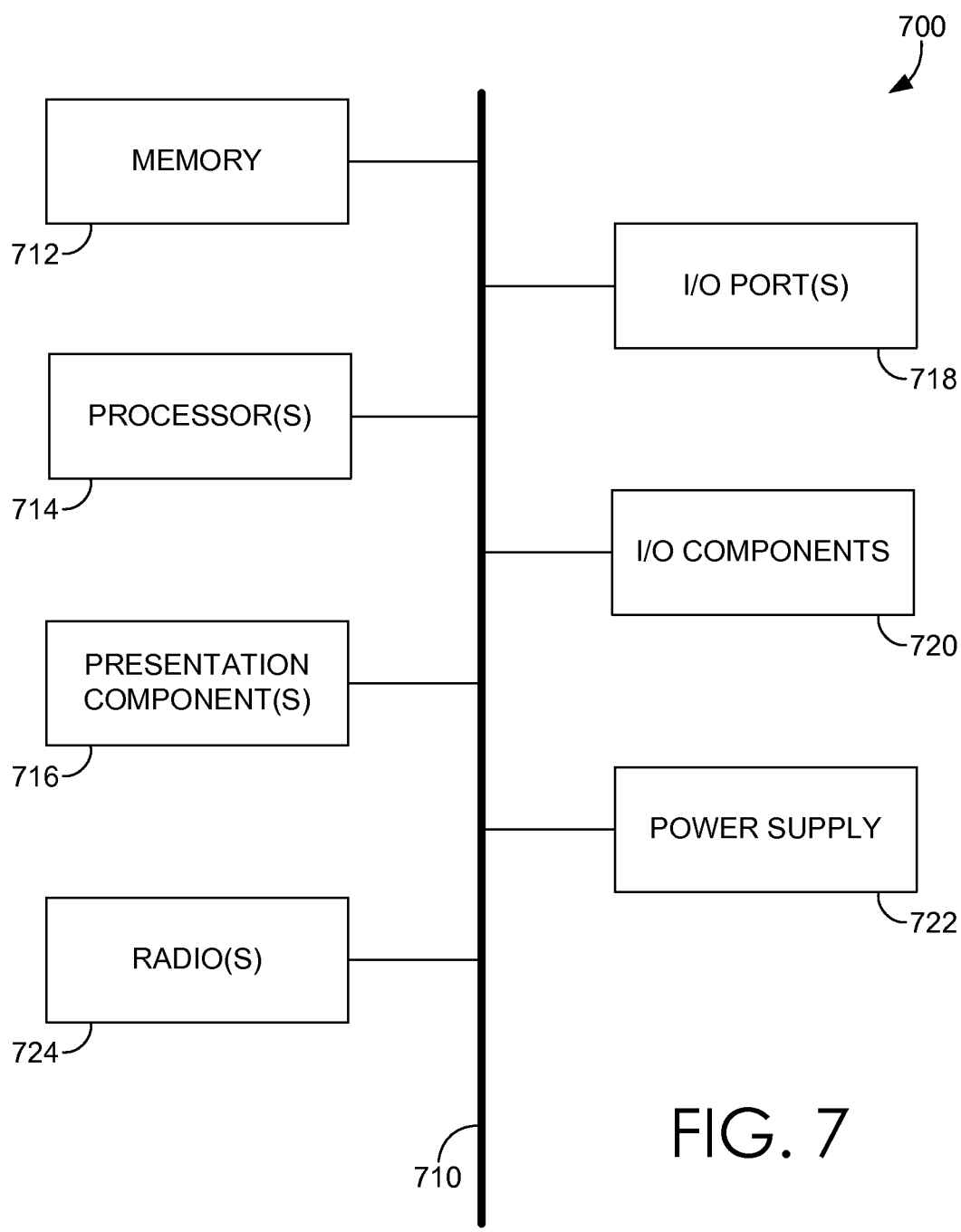
FIG. 7 is a block diagram of an exemplary computing environment in which embodiments of the invention may be employed.

Accordingly, referring generally to FIG. 7, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for controlling spend pacing in a distributed computer-implemented environment, the method comprising:
referencing a spend rate allocated to a first data center among multiple data centers managed by a global bidding manager, each data center having a plurality of bidders configured to place bids for advertisements, the spend rate specifying a target monetary budget per unit of time, wherein the spend rate is proportional to a spend potential for the first data center compared to spend potentials corresponding to each of the multiple data centers, the spend potentials received at the global bidding manager;
at a local bidding manager having one or more processors determining, based on the spend rate allocated to the first data center, a spend rate per bidder for each of the plurality of bidders within the first data center;
identifying a decrease in advertisement traffic;
generating, by the local bidding manager and based on the spend rate per bidder, target bid rates, one for each of the plurality of bidders, each of the target bid rates specifying a target number of advertisement bids, per unit of time, associated with a real time advertisement auction, at least one of the target bid rates comprising a bid rate boost that temporarily increases the at least one target bid rate in response to the decrease in advertisement traffic; and
providing, via the one or more processors, the target bid rates from the local bidding manager to the plurality of bidders within the first data center, wherein each of the plurality of bidders is configured to use a corresponding one of the target bid rates to determine whether to place a bid for an advertisement.

2. The method of claim 1, wherein the spend rate allocated to the first data center is determined at the global bidding manager that manages the multiple data centers.

3. The method of claim 2, wherein the determination of the spend rate allocated to the first data center is based on data received at the global bidding manager from the multiple data centers.

4. The method of claim 1, wherein the spend rate per bidder is determined using a number of active bidders within the first data center and the spend rate allocated to the first data center.

5. The method of claim 1, wherein the spend rate allocated to the first data center comprises a spend rate boost that temporarily increases the spend rate for a time period in response to an identified shortfall of monetary spend.

6. The method of claim 1, wherein a second target bid rate of the target bid rates comprises a bid rate boost that temporarily increases the second target bid rate in response to an identified shortfall of monetary spend.

7. The method of claim 1, wherein a second target bid rate of the target bid rates is generated based on the allocated spend rate per bidder, a number of advertisement bids submitted within a recent time period, and a total cost of impressions viewed within the recent time period.

8. The method of claim 1, wherein a second target bid rate of the target bid rates is generated based on the allocated spend rate per bidder, a win rate associated with a recent time period, and a cost per impression associated with the recent time period.

9. The method of claim 1, wherein utilization of the corresponding target bid rate to determine whether to place the bid for the advertisement provides pacing control of advertisement spend.

10. One or more non-transitory computer storage media storing computer-useable instructions that, when used by a computing device, cause the computing device to perform a method for facilitating control of advertising spend, the method comprising:
obtaining a target bid rate at a bidder having one or more processors, the target bid rate specifying a target number of advertisement bids, per unit of time, associated with a real time advertisement auction, the target bid rate generated for the bidder by a local bidding manager included within a first data center among multiple data centers, the target bid rate comprising a bid rate boost that temporarily increases the target bid rate in response to a decrease in advertisement traffic identified by the local bidding manager, the multiple data centers controlled by a global bidding manager based on a spend rate allocated to the first data center by the global bidding manager, the spend rate proportional to a spend potential for the first data center compared to spend potentials corresponding to each of the multiple data centers, the spend potentials received at the global bidding manger, the spend rate specifying a target monetary budget per unit of time;
receiving, at the bidder, a bid request requesting participation in an advertisement auction; and
using, at the bidder, the target bid rate to determine whether to place an advertisement bid in association with an advertisement.

11. The one or more computer storage media of claim 10, the target bid rate generated based on an assigned spend rate for the bidder, a number of advertisement bids submitted within a recent time period, and a total cost of impressions viewed within the recent time period.

12. The one or more computer storage media of claim 10, the target bid rate generated based on an assigned spend rate for the bidder, a win rate associated with a recent time period, and a cost per impression associated with the recent time period.

13. The one or more computer storage media of claim 10, the target bid rate provided by the local bidding manager associated with the first data center having a plurality of bidders.

14. The one or more computer storage media of claim 13, wherein the local bidding manager is configured to provide a corresponding target bid rate to each of the plurality of bidders such that the plurality of bidders are configured to produce advertisement bids in an amount that corresponds with the spend rate for the first data center.

15. The one or more computer storage media of claim 10, the allocated spend rate provided to the first data center by the global bidding manager that controls multiple data centers.

16. A system for facilitating control of advertising spend, the system comprising:
a global bidding manager configured to generate, based at least on spend potentials collected from each of a plurality of data centers, spend rates for each of the plurality of data centers, and distribute the spend rates to corresponding data centers, wherein each of the spend rates specifies a target monetary budget per unit of time, and wherein a spend rate generated for a first data center of the plurality of data centers is proportional to a spend potential for the first data center compared to the spend potentials corresponding to each of the plurality of data centers, the spend potentials received at the global bidding manager;

a plurality of local bidding managers in communication with the global bidding manager, each local bidding manager associated with a corresponding data center and being configured to receive a corresponding spend rate from the global bidding manager, identify a decrease in advertisement traffic, allocate target bid rates within the data center based on the corresponding spend rate, and distribute the target bid rates within the data center, each of the target bid rates specifying a target number of advertisement bids, per unit of time, associated with a real time advertisement auction, at least one of the target bid rates comprising a bid rate boost that temporarily increases the at least one target bid rate in response to the decrease in advertisement traffic; and a plurality of bidders associated with each data center, the plurality of bidders in communication with a corresponding local bidding manager in the data center, wherein each of the plurality of bidders is configured to receive a corresponding target bid rate from the corresponding local bidding manager, wherein the global bidding manager is configured to manage the spend rates across the data centers using data collected from the plurality of local bidding managers, and wherein each of the local bidding managers is configured to manage the target bid rates across the plurality of bidders associated with the local bidding manager using data collected from the plurality of bidders.

17. The system of claim 16, wherein each of the plurality of bidders is configured to independently act on the corresponding target bid rate such that the target bid rates across the plurality of bidders are configured to produce advertisement bids in an amount that corresponds with the spend rate allocated to the corresponding data center.

* * * * *